United States Patent [19]

MacDuff

[11] 3,734,226
[45] May 22, 1973

[54] AUXILIARY ELECTRIC MOTOR DRIVE FOR POWER STEERING PUMP

[75] Inventor: Stanley I. MacDuff, Daytona Beach, Fla.

[73] Assignee: The Bendix Corporation, South Bend, Ind.

[22] Filed: June 25, 1971

[21] Appl. No.: 156,720

[52] U.S. Cl. ............................180/79.2 R, 60/52 S
[51] Int. Cl............B62d 5/06, 180 79.2 R, 60 525;6
[58] Field of Search............................417/223, 319; 74/661

[56] References Cited

UNITED STATES PATENTS

| | | | |
|---|---|---|---|
| 3,528,522 | 9/1970 | Turke | 180/79.2 R |
| 2,860,713 | 11/1958 | Peterson | 74/661 UX |
| 3,275,177 | 9/1966 | Barto | 60/6 X |
| 2,166,635 | 7/1939 | Locke | 417/319 X |
| 2,902,205 | 9/1959 | Parker | 417/319 |

Primary Examiner—Leo Friaglia
Assistant Examiner—John A. Pekar
Attorney—Ken C. Decker et al.

[57] ABSTRACT

In a vehicle having hydraulic power assisted devices such as power steering or a hydraulic power brake booster, an auxiliary pump drive comprising an engine driven belt drive including an over-running clutch connected to the pump, an electric motor driven belt drive including a second over-running clutch connected to the pump, and control means including the vehicle ignition switch and a switch operated by a centrifugal switch operating means mounted on and rotated by the engine driven pump pulley.

5 Claims, 1 Drawing Figure

PATENTED MAY 22 1973
3,734,226
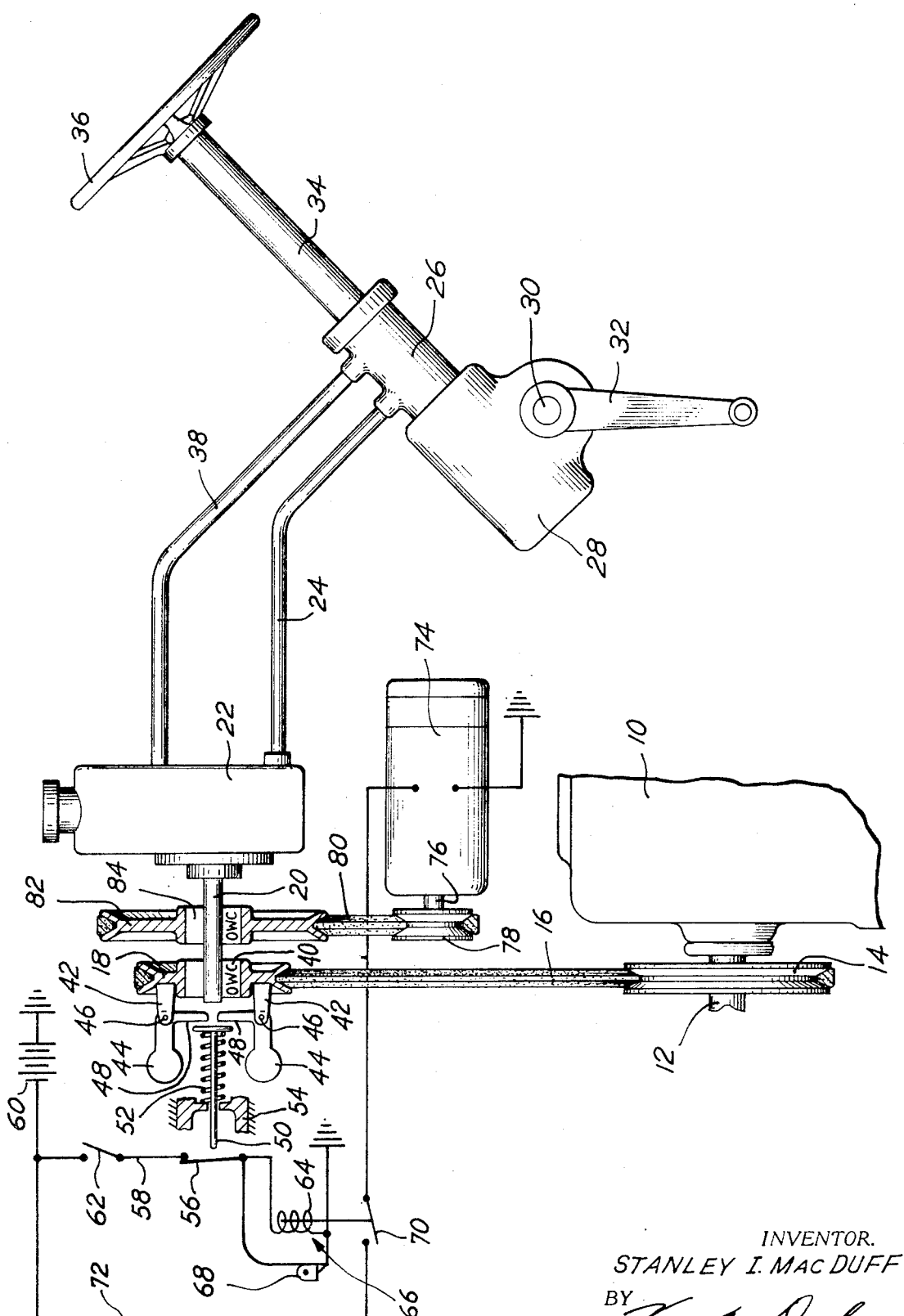
INVENTOR.
STANLEY I. MAC DUFF
BY
*Roy C. Decker*
ATTORNEY

AUXILIARY ELECTRIC MOTOR DRIVE FOR POWER STEERING PUMP

BACKGROUND OF THE INVENTION

An increasing number of automotive vehicles are being equipped with hydraulic power assisted devices due to the ease of handling which they provide. Unfortunately, this ease of handling is lost in the event of engine failure or breakage of a pump drive belt. This is disconcerting to many drivers and contributes to an unsafe condition if the driver, unaware of the normal increase in effort, assumes that a complete failure of the steering or brakes has occurred.

On occasion, when a person is in the act of starting a vehicle, it may be necessary to operate the brakes or steering. Again, because the pump is not yet functioning, the efforts required for such operations are substantially increased, and a driver, such as a woman of small stature, may lack the physical strength to operate them. Such a condition may arise if the vehicle is parked on a hill and the driver takes the transmission control out of the "park" position prior to starting the engine.

SUMMARY OF THE INVENTION

It is an object of this invention to provide an auxiliary pump drive system which will supply enough power to the power assist devices to prevent the substantial increases in effort normally resulting from engine stalls or belt failures.

It is another object of the invention to make the operation of the auxiliary pump drive system completely automatic so that no additional training is required to enable a driver to obtain full use and benefit from it.

To accomplish these objects, there is provided in parallel to the normal engine-to-pump belt drive, an electric motor drive which may also conveniently be a belt drive. An over-running clutch is placed in the engine pump drive so that the pump may be operated freely with the engine stopped. A similar over-running clutch may be placed in the electric motor drive to avoid the wear of bearings and brushes that would occur if the motor were driven at all times the engine is running. The drive ratio of the electric motor drive preferably is higher than the drive ratio of the engine drive because it is impractical to extract enough energy from the vehicle electrical system to fully match the capability of the hydraulic system when driven by the engine.

The engine driven pulley on the pump is provided with a control means including centrifugally operated switch operating means. A switch operated by the switch operating means is connected in series with the ignition switch to energize a motor starting relay which starts the electric motor of the auxiliary drive means. The switch is normally closed and is opened by the centrifugal operator when the engine is running and the pump is being driven thereby. It will be understood that, by placing the centrifugal operator on the pump pulley of the engine drive means, protection is provided against belt breakage. If belt breakage occurs while the engine is running, the centrifugal device will collapse and permit the switch to revert to its normally closed condition and start the electric motor auxiliary drive.

BRIEF DESCRIPTION OF THE DRAWING

The sole FIGURE of the drawing is a diagrammatic view of a vehicle hydraulic system made pursuant to the teachings of the invention.

DETAILED DESCRIPTION OF THE INVENTION

Referring to the drawing, there is shown part of an engine 10 having an engine shaft 12 on which a pulley 14 is mounted. A first belt 16 interconnects the pulley 14 with a first pump drive pulley 18 mounted on a drive shaft 20 of a hydraulic pump 22. The pump 22 is bracketed to the engine by the usual means (not shown). The pump 22 has a discharge line 24 leading to the valve 26 of a power steering gear 28 installed in the vehicle in the conventional manner. The power steering gear 28 is shown as having an output shaft 30 on which a pitman arm 32 is secured. The pitman arm 32 is connected to the vehicle steering linkage (not shown). The steering gear 28 has a steering column 34 upon which a steering wheel 36 is mounted for operation by the driver. A return line 38 conducts fluid from the steering gear valve 26 to the pump 22. The pump 22 is illustrated as having an integral reservoir which has not been separately numbered. It should be understood that what has been described to this point are the conventional elements of a hydraulic power steering system. Although it has not been illustrated, it should be understood that such a system may include a power brake booster of the type described in U. S. Pat. Application No. 793,923, filed Jan. 16, 1969, having in common with this application the same assignee.

Returning to the pump 22, there is shown a first overrunning clutch 40 built into the hub of the pulley 18 and positioned between the pulley 18 and the pump drive shaft 20. The pulley 14 also is formed with brackets 42 to which centrifugal weights 44 are swingably secured by pins 46. Belcrank levers 48, integral with the centrifugal weights 44, are positioned to engage a switch operating plunger 50 and move it against the force of a return spring 52. The plunger 50 and return spring 52 are supported by fixed structure 54 attached to the engine.

A normally closed switch 56 is also supported by the structure 54 in a position to be engaged and opened by the movement of the switch operating plunger 50. The switch 56 is connected in a series circuit 58 with a vehicle battery 60, a vehicle ignition switch 62 and a coil 64 of a motor starting relay designated generally by the numeral 66. A signal lamp 68, installed on the vehicle instrument panel (not shown), is connected across the terminals of the coil 64. The coil 64, when energized, closes motor starting switch 70 connected in a series circuit 72 with the vehicle battery 60 and the windings (not shown) of an electric motor 74. The battery 60, the windings of the electric motor 74, and the coil 64 of the relay 66 are all connected to ground as indicated by the ground symbols in order to complete the electrical circuits.

The electric motor 74 is the source of power for the auxiliary pump drive and is provided with a shaft 76 upon which a relatively small pulley 78 is mounted. A second belt 80 interconnects the pulley 78 with a proportionately large second pump drive pulley 82 mounted on the pump shaft 20. An over-running clutch 84, built into the hub of the pulley 82, is positioned between the pulley 82 and the pump shaft 20.

OPERATION OF THE INVENTION

When a driver undertakes to start the engine 10 of a vehicle equipped with the system of the invention, the ignition switch 62 is actuated. Since the engine driven pump pulley 18 is not rotating, the centrifugal weights 44 are held in the illustrated position by the force of the return spring 52. The switch operating plunger 50 is disposed away from the switch 56 permitting it to remain in its normally closed position. Therefore, upon operation of the ignition switch 62, the circuit 58 is closed causing the coil 64 of the relay 66 to close the switch 70 in the circuit 72. Closing the switch 70 starts the auxiliary pump drive motor 74 to drive the pump 22. The drive is transmitted through the second over-running clutch 84. Since the engine 10 is not running, the first over-running clutch 40 over runs because the pulley 18 is held stationary by the first belt 16 in engagement with the engine pulley 14. The voltage drop across the coil 64 causes the signal lamp 68 to light, indicating to the driver that the auxiliary pump drive means is working. Failure of the light 68 to come on is evidence of failure of the system and the need of service or repair. The drive ratio of the auxiliary drive means provided by the small motor pulley 78 and the large second pump drive pulley 82 is such that the motor 74, which may run at 3,000 rpm., drives the pump 22 at some speed substantially less than the 700 or 800 rpm. at which it is driven by the engine at engine idle speed. The output of the pump 22 under these conditions is calculated to be adequate to provide boost power for most steering or braking needs.

When the engine starts, the engine pulley 14 and first belt 16 drive the pulley 18 up to full idle speed, or higher if the engine throttle is opened, and the first over-running clutch 40 picks up the drive, increasing the speed of the pump shaft 20 and causing the second over-running clutch 84 to over run. As soon as the pulley 18 is up to speed, the centrifugal weights 44 swing out to an increased radius and the bellcrank levers 48 move the switch plunger 50 against the force of the spring 52. The motion of the plunger 50 opens the switch 56, breaking the circuit 58 and permitting the coil 64 of the relay 66 to release the switch 70. The opening of the switch 70 stops the electric motor 74, whereupon the clutch 84 continues to over run at increased speed. Lack of voltage across the coil 64 extinguishes the lamp 68, indicating to the driver that the auxiliary pump drive means has been shut off. The hydraulic power assisted devices of the vehicle will now function normally, and at full power.

If the engine 10 stalls, for instance when the driver is turning a corner, the pulley 18 is brought to a stop. The centrifugal weights 44 collapse under the impulse of the spring 52 and the switch operating plunger 50 is withdrawn, permitting the switch 56 to close again. The relay 66 is energized, closing the switch 70, and the motor 74 is started. The motor 74 immediately picks up the drive of the pump 72 through the second over-running clutch 84, causing the first over-running clutch 40 to over run. The pump 22 is driven and power is restored to the hydraulic power assisted devices such as the power steering gear 28.

The same thing happens in the event of breakage of the belt 16, the only difference being that the pulley 18 is left free to turn with the shaft 20, after the electric motor 74 has been started by operation of the switch operating means or control means. However, since the electric motor turns the shaft 20 at a speed lower than engine idle speed, it is possible to set the force of the return spring 52 high enough so that the centrifugal weights will be held in their collapsed position and will not act to open the switch 56. Also, because the pulley 18 can be driven only by friction in the over-running clutch 40, it is unlikely that it will ever run up to the full speed at which the auxiliary electric motor drive means is rotating the pump shaft 20. This gives an additional measure of protection against a possible failure of the system to work properly in event of a broken belt.

I claim:

1. In an automotive vehicle having an engine and a power assist device including a pump provided with a single ended drive shaft, pump drive means comprising:
   engine drive means for driving said pump including;
   a. a first pulley provided with first overrunning clutch means connecting the same to said pump drive shaft for driving the same,
   b. a drive belt connecting said engine to said first pulley,
   auxiliary drive means for driving said pump including;
   c. a second pulley provided with second overrunning clutch means connecting the same to said pump drive shaft,
   d. normally inoperative motor means operative independently of said engine,
   e. a drive belt connecting said motor means to said second pulley,
   f. control means responsive to operating failure of said engine and connected to energize said motor means in the event of said engine operating failure to thereby drive said second pulley and this said pump,
   said first and second overrunning clutches being operative to permit said pump drive shaft to rotate relative to one of said first and second pulleys depending upon which of said first and second pulleys provides the driving force to said drive shaft.

2. The invention of claim 1 in which the vehicle is provided with an ignition switch and the control means operates to start the motor drive means only when the ignition switch is closed.

3. The invention of claim 1 wherein:
   said auxiliary drive means including an electric motor and a source of electric power therefor;
   said control means including switch means for connecting said electric motor to said source of electric power, centrifugally operated weight means operatively connected to said engine and driven thereby, said weight means being movable in response to rotation of said engine and actuated from a first position to a second position for actuating said switch means.

4. The invention of claim 3 wherein:
   said switch means includes a relay having a coil and a first switch operated by said coil for connecting said electric motor to said source of electric power; and
   a second switch operatively connected to and actuated by said weight means when said weight means are moved to said second position to connect said coil to said source of electric power thereby energizing the same.

5. The invention of claim 3 wherein:
   said centrifugally operated weight means is mounted on said first pulley and rotatable therewith.

* * * * *